C. F. JOHNSON.
AUTOMATIC CONTROL DEVICE.
APPLICATION FILED APR. 12, 1915.
1,272,810.
Patented July 16, 1918.
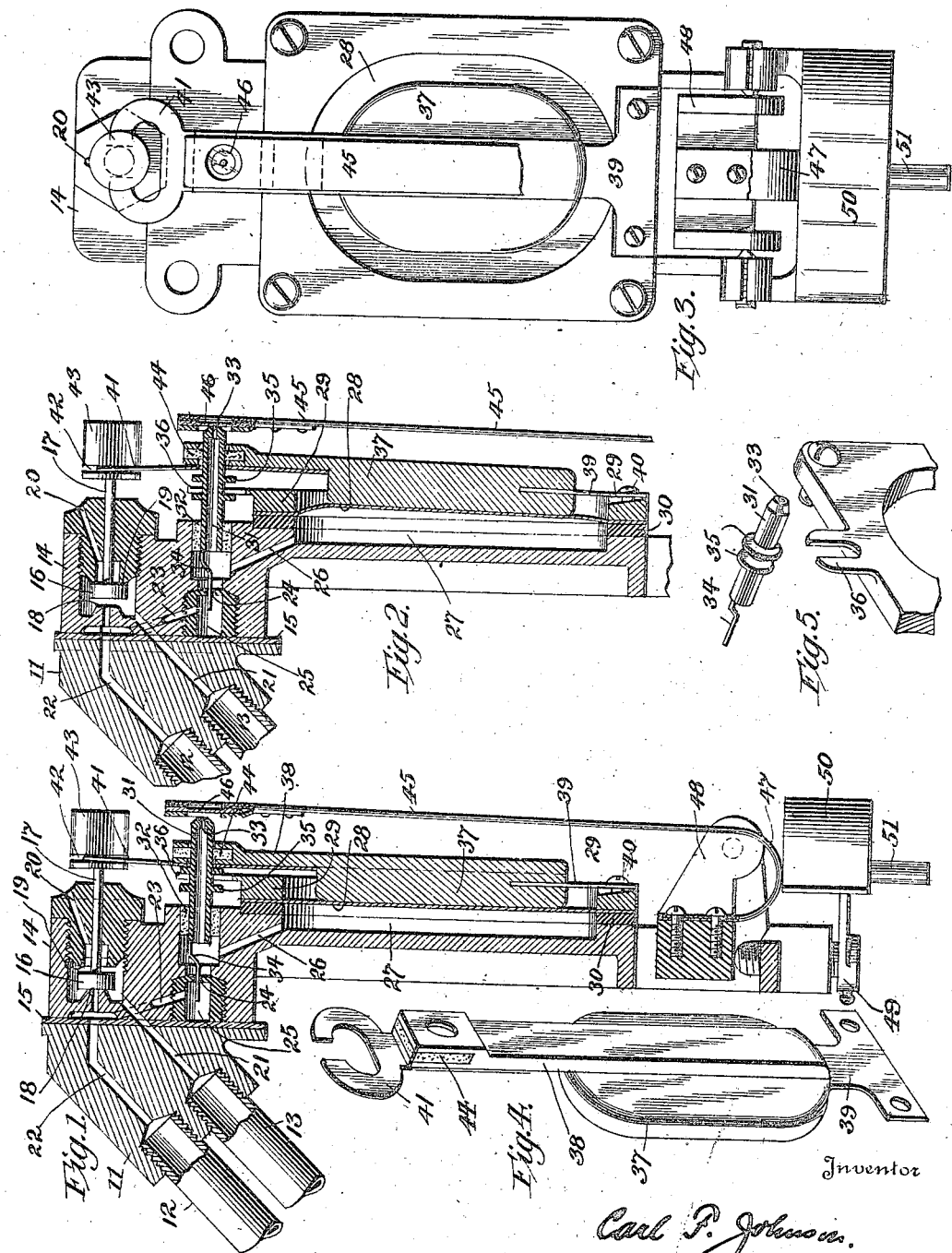
Inventor
Carl F. Johnson.
By
Dodge and Sons
Attorney

UNITED STATES PATENT OFFICE.

CARL F. JOHNSON, OF MILWAUKEE, WISCONSIN, ASSIGNOR TO JOHNSON SERVICE COMPANY, OF MILWAUKEE, WISCONSIN, A CORPORATION OF WISCONSIN.

AUTOMATIC CONTROL DEVICE.

1,272,810.

Specification of Letters Patent.   Patented July 16, 1918.

Application filed April 12, 1915. Serial No. 20,930.

*To all whom it may concern:*

Be it known that I, CARL F. JOHNSON, a citizen of the United States, residing at Milwaukee, in the county of Milwaukee and State of Wisconsin, have invented certain new and useful Improvements in Automatic Control Devices, of which the following is a specification.

This invention relates to automatic control devices and is illustrated as applied to a thermostat for use in temperature control systems of the class of which the Johnson system of temperature regulation is typical.

The invention is applicable to other automatic control systems of the Johnson type, such as systems for controlling humidity and the like, by the simple substitution of the appropriate responsive element in place of the thermostatic bar, as is well understood by those skilled in the art, and as will be hereinafter more fully pointed out.

In the Johnson system of automatic control a responsive element, for example a bimetallic thermostatic bar, moves under the influence of atmospheric changes to open and close a leak port. Through this leak port, when open, fluid under pressure, usually compressed air, escapes at a restricted rate from a diaphragm chamber to which it is supplied by a port of smaller capacity than the leak port. Consequently when the leak port is open the diaphragm collapses and when the leak port is closed the diaphragm is distended. This diaphragm is connected to operate a control device, for example a three-way valve which admits or exhausts air to and from a secondary motor directly connected to dampers, valves or the like. In order to secure the necessary sudden movement of the three-way valve a quick throw device has always been interposed between the diaphragm and the three-way valve, and the purpose of the present invention is to accelerate the action of the diaphragm so as to permit the elimination of the quick throw mechanism.

In a prior but co-pending application, Serial No. 842,225, filed June 1, 1914, (issued as Patent No. 1,162,170, November 30, 1915) I describe an automatic control device in which this result is accomplished by making use of a shifting leak port actuated by a secondary diaphragm subject to the pressure in the main diaphragm chamber. Thus when the responsive element starts to open the leak port the resulting initial fall of pressure causes the leak port to shift far enough to open completely, and bring about the sudden collapse of the main diaphragm. Upon the initial closing of the leak port a reverse shifting of the leak port, due to the initial rise in pressure, on the secondary diaphragm, causes a sudden sealing and consequent sudden distention of the main diaphragm. The present invention is a development of the same idea but in the device of the present application the leak port is shifted directly by the initial movement of the main or motor diaphragm itself and the parts are so arranged that the leak port is shifted by the initial movement of the diaphragm and before any movement of the three-way valve, or other control device, takes place.

The invention is illustrated as applied to a thermostat in the accompanying drawings, in which:—

Figure 1 is a vertical axial section of the complete device showing the leak port open and the three-way valve in exhaust position;

Fig. 2 is a fragmentary view similar to Fig. 1, showing the leak port closed and the three-way valve in admission position;

Fig. 3 is a front elevation of the complete device;

Fig. 4 is a perspective view of the motor arm and the attached parts; and

Fig. 5 is a perspective view of the shifting leak port and the two stop lugs therefor formed on the diaphragm clamping ring, these parts being shown disengaged to show their form and relation.

In the accompanying drawings the size of the leak and supply ports is necessarily exaggerated to make them clear. For similar reasons the movement of the motor arm and diaphragm is also exaggerated. In the device as actually constructed the leak port is quite minute and the range of its shifting movement is not necessarily quite so great as the drawings indicate. The same is true of the movement of the three-way valve. The purpose in the drawing is to give a clear idea of the relative movement of the parts rather than the actual degree of such movement which is so slight as to render accurate illustration impracticable. The range of movement of the parts is subject to considerable possible variation, but in view of the necessary minuteness of the leak port to avoid needless wasting of air, sharper quicker action may be secured by limiting the movement to the possible operative minimum, as this reduces the quantity of air which must be vented or accumulated to produce the desired action of the diaphragm.

In the drawings 11 represents the pipe head to which are connected the pressure supply pipe 12, and the control pipe 13 which leads to the secondary motor or other controlled device. 14 represents the main casing or frame of the thermostat which is clamped against the pipe head 11 in the usual manner with an intervening gasket 15, as shown. The casing 14 is provided with a three-way valve chamber in which works the valve member 16. This is shifted by means of a stem 17 so as to seal alternately against the opposed seats 18 and 19. When it seals against the seat 18 the exhaust port 20 is open, and consequently air is vented from the controlled device through the pipe 13 and control port 21 connected therewith. At this time the supply of pressure fluid to the controlled device is cut off. When the valve 16 seals against the seat 19 the exhaust port 20 is closed and pressure fluid is supplied through the pipe 12 and the communicating supply port 22 to port 21 and pipe 13 so that the controlled device is put under pressure.

Leading from the port 22 in advance of the valve seat 18 is a port 23 which leads to the restricted inlet 24 here shown as a minute orifice in a thimble shaped shell 25. Air entering by ports 22 and 23 may pass through a port 26 to a diaphragm chamber 27 formed in the casing 14 where it will act against a diaphragm 28 preferably of metal held by a clamp ring 29 against a rubber or other gasket 30. The leak port from the diaphragm chamber may be located in various positions, but is here illustrated as positioned directly in front of the restricted supply port 24. The leak port element comprises a tube 31 sliding through a packing sleeve 32 mounted in the front of the casing 14. This tube is provided with a minute orifice 33 at its front end with a rearwardly projecting minute pin or wire 34 at its rear end. This pin or wire 34 passes through but does not fill the supply port 24 and the purpose of the pin is to keep this supply port clear by the back and forth movement of the pin 34 as the leak tube 31 shifts. The area of the supply port is consequently the annular space in the port 24 surrounding the pin 34. The forward and backward movements of the leak tube 31 are limited by annular flanges 35 which embrace stop lugs 36 formed on the diaphragm clamping ring 29. The diaphragm 28 acts directly against a plate 37 formed as a part of the motor lever 38. The lever 38 is mounted on a spring plate 39 which is held by screws 40 against a beveled face on the clamping ring 29. The plate thus serves as a combined hinge and restoring spring, whose stress may be adjusted by means of the screws 40. The upper end of the lever 38 carries a fork 41 of relatively thin resilient sheet metal and this fork 41 engages a slot 42 in a head 43 carried by the valve stem 17. The upper end of the lever 38 also has a friction bearing or packing 44 which engages the forward end of the leak tube 31, the friction being sufficient to shift the leak tube by the movements of the lever 38 but not sufficient to arrest continued movement of the lever 38 when the leak tube 31 is arrested by the engagement of its stop lugs 35 with the stop lugs 36.

The responsive element operates to open and close the leak port 33 in the end of the tube 31 and I here illustrate this as consisting of a thermostatic bar 45 mounted in the general manner described in my prior Patent No. 1,109,993, dated September 8, 1914. The bar 45 is apertured at its upper end and is there provided with a transparent celluloid valve plate 46. The bar 45 is curved at its lower end as indicated at 47 and is mounted on a weighted pivoted saddle 48. This normally rests against a stop screw 49 threaded in frame 14 and sustains the bar in operative position. The stop screw 49 carries an indicator dial 50 which is readable through an aperture in the casing of the device (not shown) and is movable by means of a handle 51.

*Operation of the device.*

The weighted saddle 48 rests against the stop screw 49 and holds bar 45 in its normal position as determined by the adjustment of the screw. The weight of the saddle 48 is sufficient to resist any pressure which may be exerted on the bar by the air tending to discharge through the port 33. With the device in the position of Fig. 1 a change in temperature in the proper direction depending on the nature of the bar 45 will cause this bar to swing to the left and start to close the leak port 33. In the position of Fig. 1 the spring plate 39 is holding the lever 38 to the left and is flexing the spring or fork 41 as indicated, so that valve 16 is urged against the seat 18. Consequently when the bar 45 moves to restrict the port 33 the first effect of the resulting increase of pressure in the diaphragm chamber 27 is to swing lever 38 partly to the right and through the action of the friction bearing 44 shift the leak tube 31 to the right into sealing contact with the valve face 46 on the bar 45. This initial movement reduces the pressure with which valve 16 is held against seat 18 but does not move the valve from that seat. As soon however as the port 33 is completely sealed, pressure in the chamber 27 will rise rapidly and the lever 38 will move farther to the right, the tube 31 being arrested by the inner stop 35. This further movement of the lever 38 carries the valve 16 into contact with the seat 19 and flexes the fork 41 to urge the valve strongly against this seat. Upon a reverse change in temperature a movement of the bar 45 to the right will first initiate a venting through the port 33, and as soon as this is sufficient to reduce the pressure in the chamber 27 the lever 38 will move slightly to the left, releasing the stress on valve 16 but not permitting it to leave the seat 19. This initial movement will carry the leak tube 31 to the left far enough to open port 33 fully. The diaphragm 28 will then immediately collapse, and the lever 38 will swing to the left under the influence of the spring plate 39, thus shifting valve 16 to seat 18 and holding it against said seat by the flexure of the fork 41. It will thus be seen that there is a resilient lost motion connection between the diaphragm and the control mechanism sufficient to allow the initial movement of the diaphragm to shift the leak port without at the same time shifting the control mechanism. This feature is important, and makes possible the elimination of the secondary diaphragm used in my prior application, above identified. The critical temperature at which the bar 45 operates to open and close the leak port may be determined by setting the dial 50, which may bear appropriate legends.

As has been stated, certain features of the present invention are applicable to hygrostats and other automatic control devices by the mere substitution of a hygrostatic element for the thermostatic bar described. This substitution is now common in the art and may be made in the general way described in my prior patent above identified, and it is therefore unnecessary to illustrate it in detail here.

In the claims I use the term "responsive element" to include thermostatic, hygrostatic and other elements which are subject to changes of form in response to atmospheric changes. I also wish specifically to point out that while a three-way valve of the general type indicated at 16 is the common control mechanism used in this art, equivalent devices such as electric switches and the like are also of familiar use in this art and might be substituted without affecting the operative functions of the thermostatic bar and the movable leak port etc., and that such substitutions are regarded as falling within the scope of my invention. The phrase "control mechanism" is used as a generic term to include all such equivalents.

Similarly the word "abutment" is used as a generic term to include such equivalents for the diaphragm as a piston or the like.

In certain of the claims I use the word "sympathetic" as applied to the control of the venting action to define generally a control in which the venting is started and stopped harmoniously with decreases and increases in pressure against the diaphragm. The opening and closing of the vent port thus tends to accentuate or intensify such fluctuation of pressure.

Having thus described my invention, what I claim is:—

1. The combination of a fluid pressure motor having a fluid pressure chamber provided with a single movable wall; a source of fluid pressure leading to said chamber; two co-acting valve members for jointly controlling by their relative movement the venting of pressure from said motor; a responsive element operatively connected with one of said valve members for moving the same in response to variations in atmospheric condition; and mechanical connections between the movable wall and the other of said valve members for moving the latter in a closing direction upon the movement of the movable wall under an increase of pressure.

2. The combination of a fluid pressure motor having a fluid pressure chamber provided with a single movable wall, a source of fluid pressure leading to said chamber; two co-acting valve members for jointly controlling by their relative movement the venting of pressure from said motor; a responsive element operatively connected with one of said valve members for moving the same in response to variations in atmospheric condition; and mechanical connections between the movable wall and the other of said valve members for moving the latter in an opening direction upon the movement of the movable wall under a decrease of pressure.

3. The combination of a fluid pressure motor having a fluid pressure chamber provided with a single movable wall; a source of fluid pressure leading to said chamber; two co-acting valve members for jointly controlling by their relative movement the venting of pressure from said motor; a responsive element operatively connected with one of said valve members for moving the same in response to variations in atmospheric condition; and mechanical connections between the movable wall and the other of said valve members, for moving the latter alternately in opening and closing directions as the movable wall moves under decrease and increase of pressure respectively.

4. The combination of a control mechanism; a fluid pressure actuated abutment for actuating said mechanism, operatively connected therewith; a source of fluid pressure leading to said abutment; two co-acting valve members for jointly controlling by their relative movement the venting of pressure from said abutment; a responsive element operatively connected with one of said valve members for moving the same in response to variations in atmospheric condition; and operative connections between said abutment and the other of said valve members for moving the latter by the initial movement of the abutment to accelerate the action of the abutment by a sympathetic control of the venting action.

5. The combination of a control mechanism having fixed limits of movement; an actuating mechanism having a wider range of movement than said control mechanism and including a fluid pressure actuated abutment for causing said movement; yielding driving connections between said actuating mechanism and said control mechanism; a source of fluid pressure leading to said abutment; two co-acting valve members for jointly controlling by their relative movement the venting of pressure from said abutment; a responsive element operatively connected with one of said valve members for moving the same in response to variations in atmospheric condition; and operative connections between said actuating mechanism and the other of said valve members for moving the latter by the initial movement of the actuating mechanism to accelerate the action of the actuating mechanism by a sympathetic control of the venting action.

6. The combination of a control mechanism having a definite range of movement; an actuating device having a wider range of movement than said control mechanism and including a fluid pressure actuated abutment for causing such movement; driving connections between said actuating mechanism and said control mechanism for moving said control mechanism by the middle portion of the movement of said actuating mechanism; a source of fluid pressure leading to said abutment; two co-acting valve members for jointly controlling by their relative movement the venting of pressure from said abutment; a responsive element operatively connected with one of said valve members for moving the same in response to variations in atmospheric condition; and operative connections between said actuating mechanism and the other of said valve members for moving the latter by the initial movement of the actuating mechanism, and prior to any movement of said control mechanism thereby, to accelerate the action of the actuating mechanism by a sympathetic control of the venting action.

7. The combination of an actuating mechanism having a definite range of movement and including a fluid pressure actuated abutment for causing such movement; a control mechanism operatively connected to said actuating mechanism and adapted to be actuated by a portion of the movement of said actuating mechanism lying intermediate the limits of said movement; a source of fluid pressure leading to said abutment; two co-acting valve members for jointly controlling by their relative movement the venting of pressure from said abutment; a responsive element operatively connected with one of said valve members for moving the same in response to variations in atmospheric condition; and operative connections between said actuating mechanism and the other of said valve members for moving the latter by the initial movement of the actuating mechanism, and prior to the movement of said control mechanism thereby, to accelerate the action of said actuating mechanism upon said control mechanism by a sympathetic control of the venting action.

8. The combination of a fluid pressure motor having a fluid pressure chamber provided with a single movable wall; a source of fluid under pressure leading to said chamber; a vent valve for controlling the venting of pressure fluid from said motor; a responsive element operatively connected with said vent valve for operating the same; and operative connections between the movable wall and vent valve for assisting by the initial movements of said wall, the operation of said vent valve previously initiated by said responsive element.

9. The combination of a control device; a pressure actuated abutment for operating the same; a source of fluid under pressure leading to said abutment; a vent valve for controlling the venting of pressure fluid from said abutment; a responsive element operatively connected with said vent valve for operating the same; and operative connections between said abutment and said vent valve for assisting by the initial movements of the abutment the operation of said vent valve previously initiated by said responsive element.

10. The combination of a diaphragm motor; a source of fluid pressure leading thereto; a shiftable member provided with a port for venting pressure from said diaphragm motor; means for limiting the movement of said shiftable member; a spring-held motor lever bearing against the diaphragm of said motor; impositive driving connections between said lever and said shiftable member for shifting the latter by the initial movement of the former; a responsive element; a valve member operatively connected with said responsive element and movable thereby into and out of sealing relation with the port in said shiftable member; a control device having a limited range of movement; and resilient connections between said motor lever and said control device.

11. The combination of a diaphragm motor; a source of fluid pressure leading thereto; a shiftable member provided with a port for venting pressure from said diaphragm motor; means for limiting the movement of said shiftable member; a spring-held motor lever bearing against the diaphragm of said motor; impositive driving connections between said lever and said shiftable member for shifting the latter by the initial movement of the former; a responsive element; a valve member operatively connected with said responsive element and movable thereby into and out of sealing relation with the port in said shiftable member; a control valve movable between oppositely disposed seats; and resilient driving connections between said motor lever and control valve for shifting the same between said seats in the alternate movements of said motor lever.

12. The combination with an automatic control device including a fluid pressure motor and a restricted port; of a clearing pin extending into said restricted port; and operative connections between said pin and said motor for moving the former by the movement of the latter.

13. The combination with an automatic control device including a pressure motor and a restricted air supply port leading thereto; of a clearing pin movable in said restricted port; and operative connections between said pin and motor for shifting the former by the movement of the latter.

14. The combination with an automatic control device including a fluid pressure motor, a restricted port leading thereto, a movable member provided with a port leading from said motor, and means for shifting said movable member by variations of pressure in said motor; of a clearing pin movable in said restricted supply port and operatively connected with said movable member to be moved by the movement of the latter.

15. The combination with an automatic control device including a fluid pressure motor, a restricted port leading thereto, a movable member provided with a port leading from said motor, and driving connections between said movable member and said motor, of a clearing pin movable in said restricted supply port and operatively connected with said movable member to move therewith.

In testimony whereof I have signed my name to this specification.

CARL F. JOHNSON.